(12) United States Patent
King

(10) Patent No.: US 10,846,095 B2
(45) Date of Patent: Nov. 24, 2020

(54) SYSTEM AND METHOD FOR PROCESSING A LOAD MICRO-OPERATION BY ALLOCATING AN ADDRESS GENERATION SCHEDULER QUEUE ENTRY WITHOUT ALLOCATING A LOAD QUEUE ENTRY

(71) Applicant: Advanced Micro Devices, Inc., Santa Clara, CA (US)

(72) Inventor: John M. King, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 111 days.

(21) Appl. No.: 15/824,729

(22) Filed: Nov. 28, 2017

(65) Prior Publication Data

US 2019/0163471 A1    May 30, 2019

(51) Int. Cl.
*G06F 9/38* (2018.01)

(52) U.S. Cl.
CPC .......... *G06F 9/3836* (2013.01); *G06F 9/3824* (2013.01); *G06F 9/3842* (2013.01); *G06F 9/3855* (2013.01)

(58) Field of Classification Search
CPC .. G06F 9/30043; G06F 9/3836; G06F 9/3824; G06F 9/3842; G06F 9/3855; G06F 9/226
See application file for complete search history.

(56) References Cited

U.S. PATENT DOCUMENTS

| | | | | |
|---|---|---|---|---|
| 6,622,235 B1* | 9/2003 | Keller | ................... | G06F 9/3836 712/214 |
| 2012/0110280 A1* | 5/2012 | Bryant | ................... | G06F 9/3842 711/154 |
| 2012/0117335 A1* | 5/2012 | Bryant | ................... | G06F 9/3834 711/146 |
| 2012/0124586 A1* | 5/2012 | Hopper | ............... | G06F 9/30145 718/102 |

(Continued)

OTHER PUBLICATIONS

J. Jaleel and B. Jacob, "Using virtual load/store queues (VLSQs) to reduce the negative effects of reordered memory instructions," 11th International Symposium on High-Performance Computer Architecture, San Francisco, CA, USA, 2005, pp. 191-200. (Year: 2005).*

(Continued)

*Primary Examiner* — Keith E Vicary
(74) *Attorney, Agent, or Firm* — Volpe Koenig

(57) ABSTRACT

A system and method for a virtual load queue is described. Load micro-operations are processed through an instruction pipeline without requiring an entry in a load queue (LDQ). An address generation scheduler queue (AGSQ) entry is allocated to the load micro-operation and a LDQ entry is not allocated to the load micro-operation. The LDQ entries are reserved for the N oldest load micro-operations, where N is the depth of the LDQ. Deallocation of the AGSQ entry is done if the load micro-operation is one of the N oldest load micro-operations, or upon successful completion of the load micro-operation. Deallocation of the AGSQ entry is not done if the load micro-operation gets a bad status and is not (Continued)

one of the N oldest micro-operations. Consequently, the AGSQ acts as a virtual queue for the LDQ and mitigates the limiting effect of the LDQ depth.

14 Claims, 4 Drawing Sheets

(56) References Cited

U.S. PATENT DOCUMENTS

| | | | | |
|---|---|---|---|---|
| 2014/0351562 A1* | 11/2014 | Spadini | ................ | G06F 9/3836 712/214 |
| 2015/0095618 A1* | 4/2015 | Abdallah | ............ | G06F 9/30043 712/214 |
| 2015/0134934 A1* | 5/2015 | Abdallah | .............. | G06F 9/3826 712/215 |
| 2016/0092236 A1* | 3/2016 | Kanapathipillai | ... | G06F 9/3842 712/216 |
| 2016/0283248 A1* | 9/2016 | Chen | ..................... | G06F 8/4434 |
| 2018/0046463 A1* | 2/2018 | King | ................... | G06F 9/30043 |
| 2018/0052613 A1* | 2/2018 | McDaniel | ................ | G06F 9/30 |
| 2018/0165096 A1* | 6/2018 | Suggs | ................ | G06F 12/0855 |
| 2018/0307492 A1* | 10/2018 | Di | ......................... | G06F 9/3836 |

OTHER PUBLICATIONS

Jaleel, A., 2006. The effects of aggressive out-of-order mechanisms on the memory sub-system (Doctoral dissertation); 151 pages Year: 2006).*

Garg, V. and Agarwal, S., Duplicating and Deconstructing Virtual Load/Store Queues; Computer Sciences Department; Univ. of Wisconsin; 8 pages (Year: 2006).*

\* cited by examiner

SYSTEM AND METHOD FOR PROCESSING A LOAD MICRO-OPERATION BY ALLOCATING AN ADDRESS GENERATION SCHEDULER QUEUE ENTRY WITHOUT ALLOCATING A LOAD QUEUE ENTRY

BACKGROUND

A processor generally has associated with it an instruction pipeline which includes fetching, decoding (or dispatching) and executing stages. The decoding stage retrieves an instruction from a fetch queue and, for load instructions, allocates entries in a load queue (LDQ). The LDQ resources are structures whose depth (i.e., number of entries that can be stored in the queue) and queue lifetime impact the performance of the processor. Although a deeper LDQ enables a higher number of instructions per clock (IPC), at some point a deeper LDQ causes timing problems. The LDQ entries are normally allocated at instruction dispatch. If a load micro-operation is at the dispatch point but the LDQ is full, dispatch is stalled until LDQ entries are deallocated. This means that the LDQ depth is a limiter for the effective window size of the processor, i.e., it is a restriction on the number of instructions that can be processed at one time.

BRIEF DESCRIPTION OF THE DRAWINGS

A more detailed understanding may be had from the following description, given by way of example in conjunction with the accompanying drawings wherein.

DETAILED DESCRIPTION

Processors generally operate pursuant to an instruction pipeline which includes fetching, decoding (or dispatching) and executing stages. The decoding or dispatching stage retrieves an instruction from a fetch queue and, for load instructions, allocates entries in a load queue (LDQ). The LDQ entries are normally allocated at instruction dispatch. If a load micro-operation is at the dispatch point but the LDQ is full, dispatch is stalled until LDQ entries are deallocated. This means that the LDQ depth is a limiter for the effective window size of the processor.

A system and method for virtual load queue is described. Certain load micro-operations which can complete successfully without requiring further tracking in a separate structure are processed through the instruction pipeline without requiring an entry in the LDQ. In particular, an address generation scheduler queue (AGSQ) entry is allocated to the load micro-operation and a LDQ entry is not allocated to the load micro-operation. The LDQ entries are reserved for the N oldest load micro-operations, where N is the depth of the LDQ. Deallocation of the AGSQ entry is done if the load micro-operation is one of N oldest micro-operations or upon successful completion of the load micro-operation. Deallocation of the AGSQ entry is not done if the load micro-operation is not one of the N oldest load micro-operations and gets a bad status. That is, the load micro-operation remains on the AGSQ. Consequently, the AGSQ acts as a virtual queue for the LDQ and mitigates the limiting effect of the LDQ depth.

Figure 1:
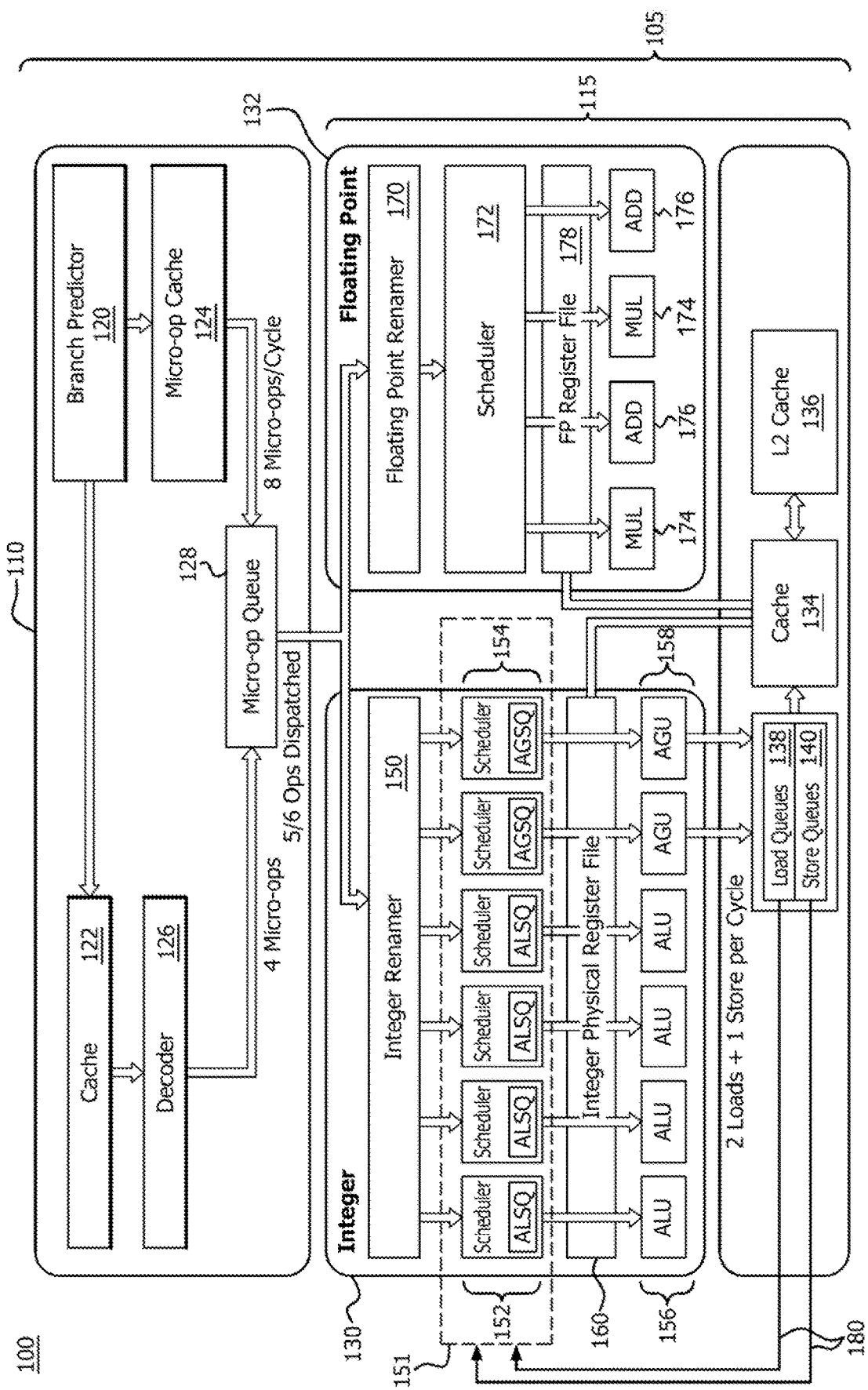
FIG. 1 is a high level block and flow diagram of a core processing unit of a processor in accordance with certain implementations.

FIG. 1 is a high level block and flow diagram of a core processing unit 105 of a processor 100 in accordance with certain implementations. The core processing unit 105 includes a decoder unit 110 which provides micro operations (micro-ops) to a scheduler and execution unit (SCEX) 115. The decoder unit 110 includes a branch predictor 120 connected to a cache 122 and a micro-op cache 124. The cache 122 is further connected to a decoder 126. The decoder 126 and the micro-op cache 124 are connected to a micro-op queue 128.

The SCEX 115 includes an integer SCEX 130 and a floating point SCEX 132, both of which are connected to a cache 134. The cache 134 is further connected to a L2 cache 136, LDQ 138 and STQ 140. The integer SCEX 130 includes an integer renamer 150 which is connected to a scheduler 151, which includes arithmetic logic unit (ALU) scheduler queues (ALSQs) 152 and address generation unit (AGU) scheduler queues (AGSQs) 154. The scheduler 151, and in particular the ALSQs 152 and AGSQs 154, are further connected to ALUs 156 and AGUs 158, respectively. The LDQ 138 and STQ 140 are connected to the scheduler 151 via path 180 to send deallocation signals. The integer SCEX 130 also includes an integer physical file register 160. The floating point SCEX 132 includes a floating point renamer 170, which is connected to a scheduler 172. The scheduler 172 is further connected to multipliers 174 and adders 176. The floating point SCEX 132 also includes a floating point physical file register 178.

A pipelined processor requires a steady stream of instructions to be fed into the pipeline. The branch predictor 120 predicts which set of micro-operations are fetched and executed in the pipelined processor. These micro-operations are fetched and stored in cache 122, which in turn are decoded by the decoder 126. The micro-op cache 124 caches the micro-operations from the branch predictor 120 as the decoder 126 decodes the micro-operations from the cache 122. The micro-op queue 128 stores and queues up the micro-operations from the decoder 126 and micro-op cache 124 for purposes of dispatching the micro-operations for execution.

In conventional pipeline processing, a LDQ entry and an AGSQ entry are allocated when a micro-op queue dispatches a load micro-operation. However, the LDQ is a limited resource in that it tracks a set number of loads from micro-operation dispatch to micro-operation completion. Once the LDQ is full, no further load micro-operations can be handled until entries are available in the LDQ. That is, the depth of the LDQ limits the window of the processor (i.e., there is a restriction on the number of micro-operations that can be processed at one time).

In accordance with an implementation, micro-op queue 128 allocates an entry in the AGSQs 154 at dispatch time for load micro-operations that are not the N oldest load micro-operations and does not allocate an entry in the LDQ 138 for load micro-operations that are not the N oldest load micro-operations. That is, the load micro-operation is allowed to move through the pipeline without allocation of the entry in the LDQ 138. In particular, the AGSQs 154 issue the address generation operation for the load micro-operation once the scheduler 151 determines that all of the sources associated with the load micro-operation's address generation are ready. Deallocation of the entry in the AGSQs 154 then depends on whether the load micro-operation is one of the N oldest load micro-operations being tracked by the LDQ 138, where N is the depth of the LDQ 138. The entry in the AGSQs 154 is deallocated if it is one of the N oldest load micro-operations as this means that the LDQ 138 is already tracking this load micro-operation. The scheduler 151 continues monitoring the status of the load micro-operation if it is not one of the N oldest load micro-operations. The entry in the AGSQs 154 is deallocated when the scheduler 151 receives a good status or completion status with respect to the load micro-operation. The entry in the AGSQs 154 is not deallocated if the load micro-operation is not one of the N oldest load micro-operations and the status is bad.

By not requiring an LDQ entry allocation at dispatch for load micro-operations that are not the N oldest load micro-operations, more load micro-ops can be dispatched than the LDQ 138 depth. In effect, the AGSQs 154 act as a virtual load queue for the LDQ 138 for load micro-operations. By eliminating the source of dispatch stalls, further load micro-operations can be introduced in a window and allowed to start execution.

Figure 2:
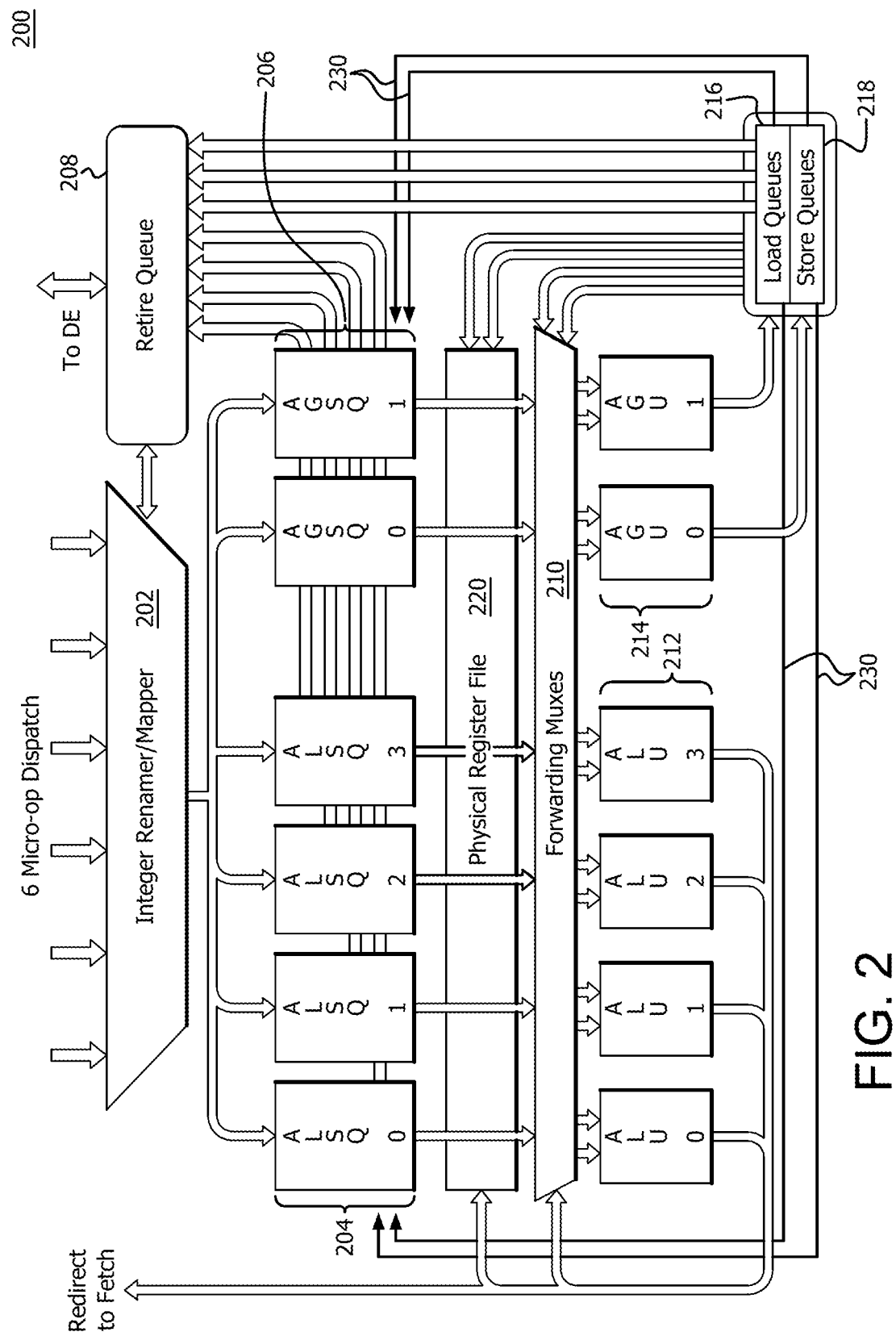
FIG. 2 is a high level block and flow diagram of an integer scheduler and/or execution unit in accordance with certain implementations.

FIG. 2 is a high level block diagram of an integer scheduler/execution unit 200 in accordance with certain implementations. The integer scheduler/execution unit 200 includes an integer renamer/mapper 202 which is connected to ALSQs 204, AGSQs 206 and a retire queue 208. The ALSQs 204 and AGSQs 206 are further connected to forwarding multiplexors 210, which in turn are connected to ALUs 212 and AGUs 214, respectively. The AGUs 214 are connected to LDQ 216 and STQ 218. The integer scheduler/execution unit 200 also includes a physical file register 220. The LDQ 216 and STQ 218 are connected to AGSQ$_0$-AGSQ$_1$ 206 via paths 230 to send deallocation signals and to retire queue 208.

Similar to FIG. 1, entries are allocated in the AGSQs 206 and not in the LDQ 216 at dispatch time for load micro-operations that are not the N oldest load micro-operations. In particular, once all of the sources associated with the load micro-operation are ready, the AGSQs 206 issue the address generation operation for the load micro-operation. The entry in the AGSQs 206 is deallocated at address generation time if the load micro-operation is one of the N oldest load micro-operations being tracked by the LDQ 216. The entry in the AGSQs 206 remains allocated at address generation time if the load micro-operation is not one of the N oldest load micro-operations being tracked by the LDQ 216. In this case, the entry in the AGSQs 206 is deallocated later if execution of the load micro-operation results in a good status and/or the load micro-operation is otherwise completed.

The determination of when a load is one of the N oldest load micro-operations can be done by assigning a "load sequence number" to load micro-operations at dispatch time, and storing this load sequence number as payload bits in the AGSQ entry. This load sequence number increments for each load micro-operation dispatched, allowing the relative age of load micro-operations to be compared by comparing the two load micro-operation's load sequence numbers. The AGSQs 206 also separately tracks the load sequence number of the youngest load micro-operation that has been dispatched, called YoungestLoadSeq, and also tracks the load sequence number of the youngest load micro-operation that has a reserved LDQ entry, called YoungestLDQLoadSeq. The AGSQs 206 update YoungestLoadSeq and YoungestLDQLoadSeq dynamically using the following rules. YoungestLoadSeq is simply incremented when load micro-operations dispatch. On a flush, it is decremented by the number of load micro-operations that were flushed, which is computed by summing the number of LDQ load micro-operations flushed (for example, computed by the LDQ flush logic) with the number of AGSQ load micro-operations flushed (for example, computed by the AGSQ flush logic).

The update of YoungestLDQloadSeq requires additional handling. When the difference YoungestLoadSeq-YoungestLDQLoadSeq is less than the depth N of the LDQ 216, YoungestLDQLoadSeq is set to the load sequence number of the youngest load micro-operation that has dispatched, i.e. YoungestLDQLoadSeq is equal to YoungestLoadSeq. When the difference YoungestLoadSeq-YoungestLDQLoadSeq is greater than or equal to N, YoungestLDQLoadSeq is set or remains set to the load sequence number of the micro-operation load that dispatched when the difference YoungestLoadSeq-YoungestLDQLoadSeq was equal to N. At load micro-operation completion time, the AGSQs 206 compare the load sequence number of the completing load micro-operation to YoungestLDQLoadSeq. If the completing load micro-operation's load sequence number indicates that the load micro-operation is older than YoungestLDQLoadSeq, this indicates that a load micro-operation that had a reserved LDQ entry is complete, and so a LDQ entry is available to be reserved by the next younger load micro-operation, so the AGSQs 206 increment YoungestLDQLoadSeq. If the completing load micro-operation is younger than YoungestLDQLoadSeq, the AGSQs 206 do not increment YoungestLDQLoadSeq, since the load micro-operation that completed did not have a reserved LDQ entry. On flushes, if the difference YoungestLoadSeq-YoungestLDQLoadSeq is now less than N, YoungestLDQLoadSeq is set to YoungestLoadSeq.

In the case when an AGSQ entry's sources are ready and the AGSQ has issued the address generation operation for the load micro-operation, and the load micro-operation was not one of the oldest N load micro-operations that are being tracked by the LDQs, but the load micro-operation did not successfully complete, various policies may be considered regarding next steps with the load micro-operation. In an implementation, the AGSQ entry may continuously re-issue the address generation operation for that load micro-operation, allowing the load micro-operation to continuously flow on the load pipeline. In another implementation, the AGSQ entry is considered as not-ready until the load micro-operation becomes one of the N oldest load micro-operations. That is, the load micro-operation is able to flow once on a load pipeline while it is not one of the N oldest load micro-operations. If the load micro-operation doesn't complete successfully during that one flow, the load micro-operation waits in the AGSQ and is considered not-ready by the scheduler until it becomes one of the N oldest load micro-operations. At that time, the AGSQ re-issues the address generation operation for the load micro-operation again. On this issue, it will be one of the oldest N load micro-operations, so it will deallocate from the AGSQ. In another implementation, the AGSQ re-issues the address generation operation for the load micro-operation entries younger than the N oldest load micro-operations occasionally based on a countdown timer, or based on an event occurring that may allow them to now complete successfully, such as a cache fill or a translation lookaside buffer (TLB) reload.

Figure 3:
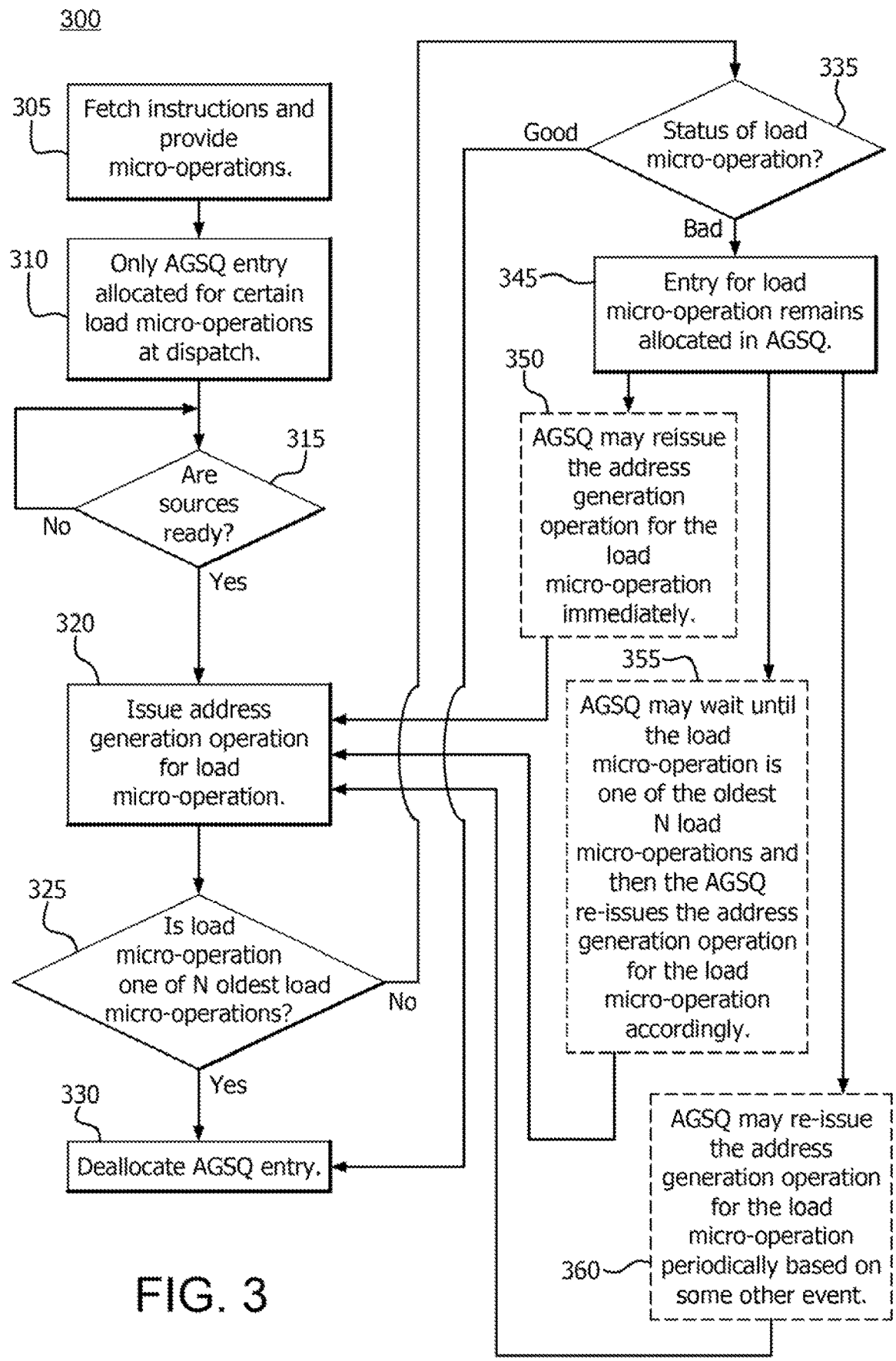
FIG. 3 is a flow diagram of a method for virtual load queue in accordance with certain implementations.

FIG. 3 is a flow diagram 300 of a method for using virtual load queue in accordance with certain implementations. Instructions are fetched, decoded and micro-operations are provided to a micro-op queue (step 305). For load micro-operations that are not one of the N oldest load micro-operations, where N is the depth of the LDQ, only an entry in an AGSQ is allocated at dispatch (step 310). A determination is made as to whether all sources are ready with respect to the load micro-operation (step 315). If sources are not ready, the method waits until all sources are ready. The load micro-operation is issued by the AGSQ if all sources are ready (step 320). A determination is made as to whether the load micro-operation is one of the N oldest load micro-operations, where N is the depth of the LDQ (step 325). The AGSQ entry is deallocated if the load micro-operation is one of the oldest N load micro-operations (step 330). The status of the load micro-operation is monitored if the load micro-operation is not one of the oldest N load micro-operations (step 335). The AGSQ entry is deallocated if the status of the load micro-operation is good or execution of the load micro-operation is completed (step 330). The load micro-operation is not deallocated and remains allocated in the AGSQ if the status is bad (step 345). For example, the status can be bad if the load micro-operation misses the cache or any other similar issues. After determining that the AGSQ entry remains allocated, one of the policies described herein is applicable. In an implementation, the AGSQ may re-issue the address generation operation for the load micro-operation immediately (step 350, 320). In another implementation, the AGSQ may wait until the load micro-operation is one of the oldest N load micro-operations and then the AGSQ re-issues the address generation operation for the load micro-operation accordingly (step 355, 320). In another implementation, the AGSQ may re-issue the address generation operation for the load micro-operation periodically based on some other event (step 360, 320).

Figure 4:
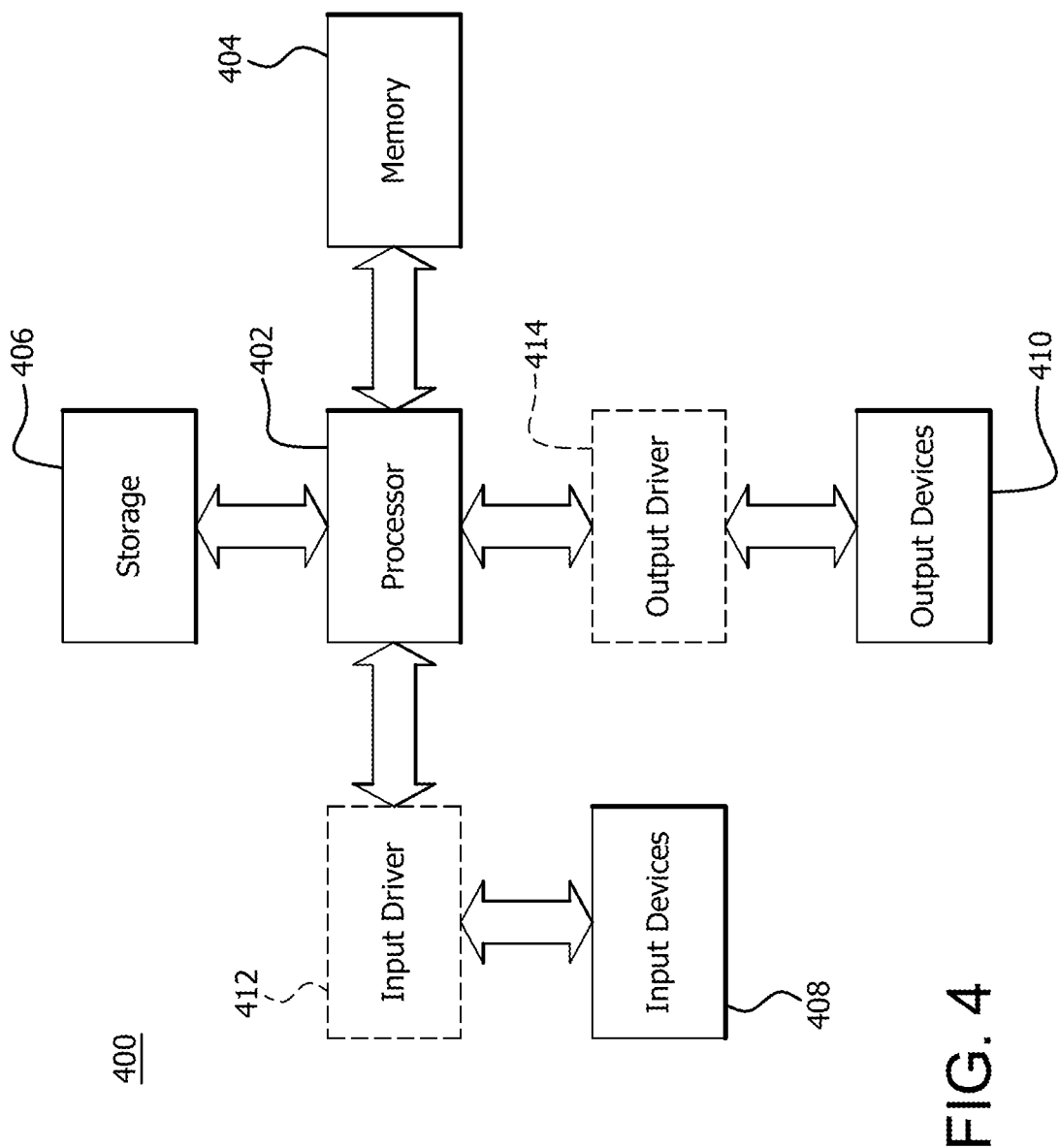
FIG. 4 is a block diagram of an example device in which one or more disclosed implementations may be implemented.

FIG. 4 is a block diagram of an example device 400 in which one or more portions of one or more disclosed examples are implemented. The device 400 includes, for example, a head mounted device, a server, a computer, a gaming device, a handheld device, a set-top box, a television, a mobile phone, or a tablet computer. The device 400 includes a compute node or processor 402, a memory 404, a storage 406, one or more input devices 408, and one or more output devices 410. The device 400 also optionally includes an input driver 412 and an output driver 414. It is understood that the device 400 includes additional components not shown in FIG. 4.

The compute node or processor 402 includes a central processing unit (CPU), a graphics processing unit (GPU), a CPU and GPU located on the same die, or one or more processor cores, wherein each processor core may be a CPU or a GPU. The memory 404 is located on the same die as the compute node or processor 402, or is located separately from the compute node or processor 402. In an implementation, the memory 404 includes a volatile or non-volatile memory, for example, random access memory (RAM), dynamic RAM, or a cache.

The storage 406 includes a fixed or removable storage, for example, a hard disk drive, a solid state drive, an optical disk, or a flash drive. The input devices 408 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 include a display, a speaker, a printer, a haptic feedback device, one or more lights, an antenna, or a network connection (e.g., a wireless local area network card for transmission and/or reception of wireless IEEE 802 signals).

The input driver 412 communicates with the compute node or processor 402 and the input devices 408, and permits the compute node or processor 402 to receive input from the input devices 408. The output driver 414 communicates with the compute node or processor 402 and the output devices 410, and permits the processor 402 to send output to the output devices 410. It is noted that the input driver 412 and the output driver 414 are optional components, and that the device 400 will operate in the same manner if the input driver 412 and the output driver 414 are not present.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing micro-operations, the method comprising:
   for a first load micro-operation for which no entry is available in a load queue, allocating a first address generation scheduler queue entry in an address generation scheduler queue at dispatch and not allocating a first load queue entry in the load queue;
   for a second load micro-operation for which an entry is available in the load queue, allocating a second address generation scheduler queue entry in the address generation scheduler queue at dispatch and allocating a second load queue entry in the load queue;
   determining that execution of the first load micro-operation results in a completed status; and
   responsive to the determining, deallocating the first address generation scheduler queue entry in the address generation scheduler queue.

2. The method of claim 1, further comprising:
   issuing an address generation operation for the first load micro-operation in response to all sources being ready with respect to the first load micro-operation.

3. The method of claim 1, further comprising:
monitoring status of the first load micro-operation in response to the load queue including no available entry for the first load micro-operation.

4. The method of claim 1, further comprising:
responsive to determining that an execution attempt of the first load micro-operation results in uncompleted execution, retaining the first address generation scheduler queue entry in the address generation scheduler queue.

5. The method of claim 4, further comprising:
immediately re-issuing an address generation operation for the first load micro-operation in response to the execution attempt resulting in uncompleted execution.

6. The method of claim 4, further comprising:
re-issuing an address generation operation for the first load micro-operation in response to the first load micro-operation becoming one of the N oldest load micro-operations, where N is a depth of the load queue, and in response to the execution attempt resulting in uncompleted execution.

7. The method of claim 4, further comprising:
re-issuing an address generation operation for the first load micro-operation on a periodic basis in response to the execution attempt resulting in uncompleted execution.

8. A processor for processing micro-operations, comprising:
a load queue;
an address generation scheduler queue; and
a micro-operation queue configured to, for a first load micro-operation for which no entry is available in the load queue, allocate a first address generation scheduler queue entry in the address generation scheduler queue at dispatch and not allocate a first load queue entry in the load queue, and, for a second load micro-operation for which an entry is available in the load queue, allocate a second address generation scheduler queue entry in the address generation scheduler queue at dispatch and allocate a second load queue entry in the load queue, wherein the address generation scheduler queue is configured to determine that execution of the first load micro-operation results in a completed status, and responsive to the determining, deallocate the first entry in the address generation scheduler queue.

9. The processor of claim 8, further comprising:
a scheduler configured to determine if all sources are ready with respect to the first load micro-operation; and
the address generation scheduler queue is further configured to issue an address generation operation for the first load micro-operation in response to the scheduler indicating that all sources are ready with respect to the first load micro-operation.

10. The processor of claim 9, wherein the scheduler is further configured to monitor status of the first load micro-operation responsive to the load queue including no available entry for the first load micro-operation.

11. The processor of claim 10, wherein the address generation scheduler queue is further configured to, responsive to determining that an execution attempt of the first load micro-operation results in uncompleted execution, retain the first address generation scheduler queue entry for the first load micro-operation.

12. The processor of claim 11, wherein the address generation scheduler queue is further configured to immediately re-issue the address generation operation for the first load micro-operation in response to the execution attempt resulting in uncompleted execution.

13. The processor of claim 11, wherein the address generation scheduler queue is further configured to re-issue the address generation operation for the first load micro-operation in response to the first load micro-operation becoming one of the N oldest load micro-operations, where N is a depth of the load queue, and in response to the execution attempt resulting in uncompleted execution.

14. The processor of claim 11, wherein the address generation scheduler queue is further configured to re-issue the address generation operation for the first load micro-operation on a periodic basis in response to the execution attempt resulting in uncompleted execution.

* * * * *